United States Patent [19]

Benoit et al.

[11] 4,183,616
[45] Jan. 15, 1980

[54] CONNECTOR FOR CONNECTING TWO GROUPS OF OPTICAL FIBRES

[75] Inventors: Pierre-Alain Benoit, Boudry; Gilbert Widmer, Bienne, both of Switzerland

[73] Assignees: Societe d'Exploitation des Cables Electriques, Cortaillod; S.A. des Cableries et Trefileries de Cossonay, Cossonay-Gare; Kabelwerke Brugg AG, Brugg, all of Switzerland

[21] Appl. No.: 816,204

[22] Filed: Jul. 15, 1977

[30] Foreign Application Priority Data

Jul. 20, 1976 [CH] Switzerland ............... 9270/76

[51] Int. Cl.² .............................................. G02B 5/14
[52] U.S. Cl. ............................... 350/96.20; 350/96.21
[58] Field of Search ............... 350/96.20, 96.21, 96.22

[56] References Cited

U.S. PATENT DOCUMENTS

| 3,305,689 | 2/1967 | Leavy, Jr. et al. | 350/96.22 X |
| 3,864,018 | 2/1975 | Miller | 350/96.21 |
| 3,912,574 | 10/1975 | Cherin et al. | 350/96.21 |
| 4,029,390 | 6/1977 | Chinnock et al. | 350/96.21 |
| 4,045,121 | 8/1977 | Clark | 350/96.21 |

FOREIGN PATENT DOCUMENTS

| 2363986 | 7/1975 | Fed. Rep. of Germany | 350/96.21 |
| 2456552 | 8/1976 | Fed. Rep. of Germany | 350/96.21 |
| 2527541 | 1/1976 | Fed. Rep. of Germany | 350/96.21 |
| 2529267 | 3/1976 | Fed. Rep. of Germany | 350/96.21 |
| 2518319 | 7/1976 | Fed. Rep. of Germany | 350/96.21 |
| 2516662 | 2/1977 | Fed. Rep. of Germany | 350/96.21 |
| 1425398 | 2/1975 | United Kingdom | 350/96.21 |

Primary Examiner—Rolf G. Hille
Attorney, Agent, or Firm—Cushman, Darby & Cushman

[57] ABSTRACT

Method for connecting two groups of optical fibres provided with a sheath or protection coating and connector for effecting this method. The unstripped optical fibres of each group are located in longitudinal grooves in a support piece of a respective connector, with the ends of the fibres extending beyond the end of each support piece; the optical fibres are retained in the grooves in each support piece; the ends of the fibres extending beyond each support piece are stripped; the optical fibres are slided in said grooves into a position where parts of the stripped ends occupy respective parts of the grooves; the unstripped and stripped portions of the optical fibres are locked in this position; the end plane of each support-fibre assembly is polished and the two connectors are joined together.

10 Claims, 4 Drawing Figures

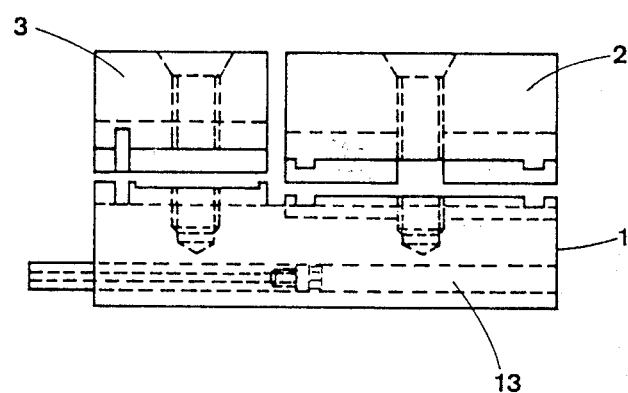
FIG. 1
FIG. 2
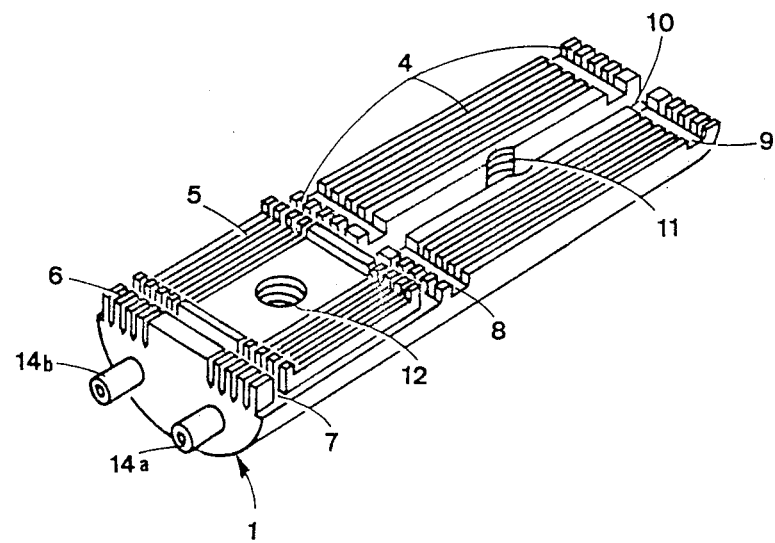

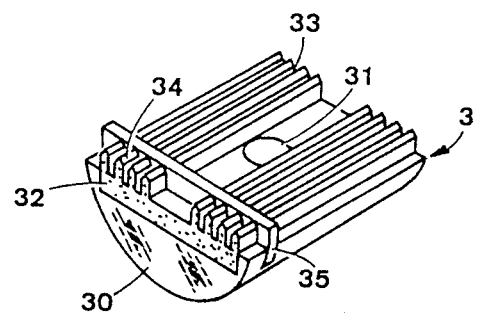
FIG. 4
FIG. 3
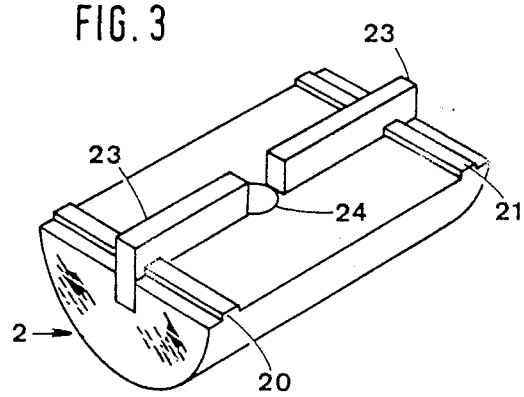

CONNECTOR FOR CONNECTING TWO GROUPS OF OPTICAL FIBRES

This invention relates to a method for connecting two groups of optical fibres provided with a sheath or protection coating, and a connector for effecting the method.

Generally, a connector for optical fibres signifies a device constituting part of a device which can be disassembled and which comprises two corresponding parts, each of which serves for holding one end of one or more optical fibres. By joining together the two connectors, the corresponding fibres become connected rigidly to each other, to allow optimum light transmission between the fibre assemblies.

The manufacture of connectors for optical fibres poses extremely delicate problems because the core of an optical fibre has a diameter of the order of only a few microns and even the smallest alignment defect between the fibres to be connected together leads to large light losses.

Consequently, in the prior art generally relatively complex devices have been provided which could only be mounted and assembled in the laboratory.

The object of the present invention is to ensure high quality connection by proper alignment of the fibres using a simple method and device which are suitable for use where optical fibres are currently mounted, for example on site rather than only in the laboratory. In particular, the object of the present invention is to provide a connection method by which the optical fibres may be placed in a connector without the stripped part of the fibres having to be touched.

To this end, the method for connecting optical fibres according to the invention is characterised by comprising disposing the unstripped optical fibres of each group to be connected into the longitudinal grooves of a corresponding support piece, with an end piece of the fibres extending beyond the support piece at the end at which the connection is to be made; retaining the optical fibres in the grooves in the support piece by means of a locking piece; stripping the ends of the fibres beyond each support piece; sliding the optical fibres in said grooves so that part of the stripped region occupies part of the length of the grooves and then locking the unstripped and stripped portions of the optical fibres in this position by means of the locking piece; polishing the end plane of each support-fibre assembly; and joining together the two support-fibre assemblies prepared in this manner.

The connector for effecting the method comprises a support piece provided with longitudinal grooves, a first locking piece and means for fixing it over part of the length of the grooves at the end other than the connection end to retain and lock the unstripped fibres in the corresponding part of the grooves, and a second locking piece and means for fixing it over part of the length of the grooves at the connection end to retain and lock the stripped fibres in the corresponding part of the grooves, the bases of the support piece grooves being of V cross-section at their connection ends and the second locking piece comprising at its corresponding end a comb of longitudinal bars of shape complementary to said grooves, the bars being of a material which deforms under the effect of the pressure exerted on the optical fibres during locking.

The accompanying drawing shows one embodiment of a connector according to the invention, by way of example.

FIG. 1 is an overall view of a connector;

FIG. 2 is a perspective view from above, of the support piece of the connector of FIG. 1;

FIG. 3 is a perspective view from below, of a first locking piece of the connector of FIG. 1;

FIG. 4 is a perspective view from below, of a second locking piece of the connector of FIG. 1.

As shown in FIG. 1, the connector comprises three main pieces, a support piece 1, a first locking piece 2 and a second locking piece 3.

As shown in FIG. 2, the support piece 1 comprises substantially parallel longitudinal grooves each of which is divided into three main sections 4, 5 and 6. These grooves are designed to finally receive partially stripped optical fibres, the section 4 of the grooves receiving a portion of covered fibre and the sections 5 and 6 an end portion of the same fibre but stripped. However, the sections 5 and 6 have a width sufficient in their upper part to enable the unstripped fibres to be pre-positioned.

In the region 6, i.e. the closest region to the end plane at which the connection is to be made between two connectors, the groove base is of V shape to allow precise positioning of the stripped part of the fibres at the base of the groove.

In the support piece 1, a transverse groove 7 is provided between the longitudinal groove sections 5 and 6, the purpose of which will be explained hereinafter in relation to the description of the second locking piece 3. The support piece 1 also comprises grooves 8, 9 and 10 to allow the first locking piece 2 to be accurately positioned on this support piece. Threaded holes 11 and 12 enable the first and second locking pieces respectively to be fixed on the support piece 1.

Two pegs 14a and 14b are fixed into bores on the front of the connector for insertion into corresponding bores in another connector. Preferably, these pegs are internally threaded tubes fixed to each of the connectors by screws penetrating into the bores 13 provided in the support pieces. The two pegs are preferably of different diameters to prevent reversal of the connectors.

FIG. 3 shows one embodiment of a first locking piece for disposing over the rear end, i.e. at the end other than the connection end of the support piece 1. This locking piece 2 comprises positioning beads 20, 21 and 23 designed to ensure correct positioning of this locking piece on the support piece. After fixing the locking piece 2 on to the support piece 1, the beads 20 and 21 press on the optical fibre portions provided with a sheath disposed in the groove sections 4. The fibres are thus retained or locked by compressing their sheath. In the embodiment shown, the first locking piece 2 comprises a central bore 24 designed for fixing this piece in conjunction with the threaded hole 11 in the support piece.

FIG. 4 is a perspective view of the second locking piece for disposing on the front part, i.e. at the connection end of the support piece 1 shown in FIG. 2. The locking piece 3 consists of a first piece 30 with a rigid part and comprising a central bore 31 which cooperates with the threaded hole 12 in the support piece. On the first piece 30 is fixed a second piece 32, e.g. of perspex, comprising a comb of longitudinal bars 34. The longitudinal bars 33 are disposed on the other side as an extension to the bars 34. The bars 33 and 34 have shapes which are complementary to the shapes of the grooves 5 and 6 so as to lock the stripped extensions of the covered fibre portions disposed in the groove portions 4.

By way of example, the bars 33 may be of substantially rectangular cross-section, the groove portions 5 being of a corresponding substantially rectangular cross-section. The bars 34 are of V shape at their end, complementary to the groove portion 6, the base of which is of V shape. Thus the stripped parts of the fibres are positioned accurately at the connection plane at the front of the connector. It will be noted that on laying the second locking piece 30 on the support piece 1 of FIG. 2, the bars 33, 34 by cooperating with the grooves 5 and 6 provide transverse positioning of the locking piece relative to the support piece.

At least one transverse bar 35, e.g. of perspex, is disposed between the bars 34 and 33 to ensure longitudinal relative positioning of the support piece 1 and the second locking piece 3. The bars 35 and corresponding groove 7 equally ensure appropriate positioning of the fibres at the base of the V grooves 6. In this respect, if the bar 35 was absent, and because of the small diameter of the optical fibre, it would be possible for the fibres to become wedged between the sides of the end inclined planes of the bars 34 and those of the corresponding bases of the grooves 6. Because of the bar 35, pressure is put on the fibres to push them towards the bases of the grooves before the tops of the bars 34 press on the fibres to lock them. The material constituting the comb of bars 33, 34 and bar 35 is a material which deforms under the effect of the pressure exerted by the optical fibre during the clamping of the locking piece on the support piece.

The front end part, comprising the groove portions 6, of the support piece 1, is the part which must be machined with the highest precision in order to determine precise positioning of the fibres in the connector. Consequently, the support piece 1, shown in FIG. 2, may be constituted of two parts, namely a part comprising a front portion of the length of the groove sections 6 of the piece 1 in the form of a plate of hard machined metal, and the remainder of the piece 1 which may be in the form of a moulding of a metal material or an injected resin.

Likewise, the locking pieces 2 and 3 may consist of a moulded or injected material. This method of construction allows particularly simple and economical manufacture of the connector. It will also be noted that in the embodiment shown, the connector once assembled is in the form of a cylinder, i.e. each piece is substantially of semi-circular cross-section. The connector may however be of shapes other than cylindrical, and may for example have a rectangular cross-section. Moreover, where the connector is of rectangular cross-section, it is particularly simple to stack several identical connectors in order to connect a large number of fibres.

When fixing the second locking piece 3 on the support piece 1, it is important to ensure that locking firstly takes place at the front end of the connector, i.e. in proximity to the connection plane. To this end, the bore 31 in the piece 30 may instead of being normal to the plane of the crests of the bars 33, 34 be at a slight angle to the normal, so that the bars are slightly inclined to the base plane of the grooves 6, 5 before any deformation due to locking. The same effect may be obtained by inclining the plane of the bar crests and/or the base plane of the corresponding grooves to the connector axis, fixing being carried out in a direction normal to this axis.

The part 32 preferably slightly projects frontwards from the piece 30. This part will then be polished simultaneously with the end of the fibres at the beginning of final polishing.

The mounting of a group of optical fibres in a connector such as that heretofore described has the advantage of great simplicity and avoids any direct manipulation of the stripped parts of the fibres.

According to the present connection method, the support piece 1 is kept fixed, for example by inserting it into a frame. The optical fibres to be inserted into the connector are positioned unstripped in the grooves in the support piece 1, with part of the fibres extending beyond the front ends of the connector. The fibres are then kept in the connector by positioning the two locking pieces 2 and 3. The second locking piece will be only slightly clamped because the fibres in that position cannot enter the base of the V grooves 6 as they have not been stripped. The fibres are then stripped at their ends beyond the connector, and then after slightly unclamping the first locking piece 2, the fibres are pulled backwards until the boundary between the stripped part and covered part of each fibre reaches the intermediate position between the groove portions 4 and 5 of the support piece. This transition is then visible, as shown in FIG. 1, in the space between the pieces 2 and 3. Thus according to the present method, to strip the ends of the fibres and place them in the connector it is not necessary to touch the fibres manually.

The locking pieces 2 and 3 are then rigidly fixed and the fibres are centred at the base of the V grooves 6 by the bar 35 of the second locking piece 3. Those fibre parts extending beyond the connector are then cut at the joint plane with the connector and polishing is carried out simultaneously on the fibres and connector surface.

Thus a perfect connection surface is obtained in which the fibre sections occupy a well defined position. The mechanical joining of the two corresponding connectors by means of the pegs 14a, 14b then gives a connection of very high optical quality.

The bores and pegs used to join two connectors may be designed to provide not only mechanical connection but electrical connection between the two connectors and electrical devices connected thereto.

What we claim is:

1. A connector for connecting two groups of optical fibres provided with a sheath or protection coating comprising a support piece provided with longitudinal grooves, a first locking piece and means for fixing it over a first part of the length of the grooves at one first end of the connector to retain and lock the unstripped fibres in the said first part of the grooves, and a second locking piece and means for fixing it over a second part of the length of the grooves at the opposite end of the connector to retain and lock the stripped fibres in the said second part of the grooves, the upper parts of the grooves having throughout their length a width sufficient to enable the unstripped fibres to be placed in those grooves and having vertical inner walls the bases of the support piece grooves being of V cross-section at the said first end of the connector and the second locking piece comprising at said end a comb of longitudinal bars of shape complementary to said grooves, the bars being of a deformable material thus allowing deformation of said bars under the pressure exerted by the fixing means of the second locking piece on the optical fibres during locking.

2. A connector as claimed in claim 1, wherein the grooves in the support piece comprise at least three sections, namely a first end section at the end of the connector remote from that at which the connection is to be made to receive the unstripped parts of the fibres, an intermediate section to receive the stripped fibres without effecting their precise positioning, and a second end section at the end of the connector at which the connection is to be made to receive the stripped fibres and the ensure their precise positioning by the V shape at the base of the grooves.

3. A connector as claimed in claim 2, wherein the support piece is formed from two assembled parts, the first part comprising the first end and intermediate sections of the grooves, and the second piece comprising the second end section.

4. A connector as claimed in claim 1, wherein the means for fixing the second locking piece are designed such that the plane of the apices of the longitudinal bars of the piece are inclined to the base plane of the corresponding grooves of the support piece before and deformation on locking, so that when locking takes place, pressure is firstly exerted on the fibres at the extreme end part of the connection end of the connector.

5. A connector as claimed in claim 1, wherein the longitudinal bars of the second locking piece and the corresponding grooves of the support piece are disposed such that the plane of the apices of said longitudinal bars are inclined to the base plane of the corresponding grooves of the support piece before any deformation on locking, so that when locking takes place, pressure is firstly exerted on the fibres at the extreme end part of the connection end of the connector.

6. A connector as claimed in claim 2, wherein the support piece comprises at least one transverse groove disposed between the second end section and the intermediate section of grooves and extending perpendicular to said grooves, and the second locking piece comprises at least one transverse bar complementary to the transverse groove or grooves of the support piece in order to press the fibres to the base of the V grooves during their locking.

7. A connector as claimed in claim 6, wherein the transverse bar or bars are of a material which deforms under the effect of the pressure exerted on the optical fibres during locking.

8. A connector as claimed in claim 1 further comprising means for joining the connector to a corresponding second connector.

9. A connector as claimed in claim 8, wherein the means for joining the connector to a corresponding second connector include electrical connection means between the two connectors.

10. A connector as claimed in claim 8, wherein axial bores are provided for housing connection pegs adapted to extend between two corresponding connectors.

* * * * *